(12) United States Patent
Carpenter et al.

(10) Patent No.: US 6,254,786 B1
(45) Date of Patent: Jul. 3, 2001

(54) IN-SITU METHOD TO REMOVE IRON AND OTHER METALS FROM SOLUTION IN GROUNDWATER DOWN GRADIENT FROM PERMEABLE REACTIVE BARRIER

(75) Inventors: Clay E. Carpenter; Stanley J. Morrison, both of Grand Junction, CO (US)

(73) Assignee: The United States of America as represented by the Department of Energy, Washington, DC (US)

( * ) Notice: Subject to any disclaimer, the term of this patent is extended or adjusted under 35 U.S.C. 154(b) by 0 days.

(21) Appl. No.: 09/401,588

(22) Filed: Sep. 22, 1999

(51) Int. Cl.[7] ....................................................... C02F 1/72
(52) U.S. Cl. ........................... 210/747; 210/758; 405/128
(58) Field of Search ..................................... 210/747, 758, 210/170, 198.1, 199; 405/128

(56) References Cited

U.S. PATENT DOCUMENTS

| 5,362,394 |   | 11/1994 | Blowes et al. |
|-----------|---|---------|---------------|
| 5,362,400 | * | 11/1994 | Martinell |
| 5,520,483 | * | 5/1996  | Vigneri |
| 5,534,154 | * | 7/1996  | Gillham |
| 5,626,437 | * | 5/1997  | Hunt et al. |
| 5,698,092 | * | 12/1997 | Chen |
| 6,083,407 | * | 7/2000  | Kerfoot |

OTHER PUBLICATIONS

David C. McMurty and Richard O. Elton, III, New Approach to In–Situ Treatment of Contaminated Groundwaters, Environmental Progress, vol. 4 No.3, Aug. 1985, pp. 168–170.

\* cited by examiner

*Primary Examiner*—David A. Simmons
*Assistant Examiner*—Betsey Morrison Hoey
(74) *Attorney, Agent, or Firm*—Mark F. LaMarre; Thomas G. Anderson; Paul A. Gottlieb

(57) ABSTRACT

This invention is directed to a process for treating the flow of anaerobic groundwater through an aquifer with a primary treatment media, preferably iron, and then passing the treated groundwater through a second porous media though which an oxygenated gas is passed in order to oxygenate the dissolved primary treatment material and convert it into an insoluble material thereby removing the dissolved primary treatment material from the groundwater.

6 Claims, 2 Drawing Sheets

IN-SITU METHOD TO REMOVE IRON AND OTHER METALS FROM SOLUTION IN GROUNDWATER DOWN GRADIENT FROM PERMEABLE REACTIVE BARRIER

STATEMENT AS TO RIGHTS TO INVENTIONS MADE UNDER FEDERALLY SPONSORED RESEARCH AND DEVELOPMENT

The Government has rights in this invention under contract.

BACKGROUND OF THE INVENTION

1. Field of the Invention

This invention relates to the removal of iron and manganese from groundwater. More particularly, this invention relates to the removal of iron and manganese released from the treatment media of a primary in-situ groundwater treatment system.

2. Description of Related Art

Groundwater in many localities has become contaminated by both natural and manmade impurities. Due to the considerable reliance on groundwater as a primary source of potable water, treatment of polluted groundwater to remove such contaminants has gained significant interest within the last decade. Many treatment systems for the removal of groundwater contaminants have been proposed, including pump-and-treat systems, well injection of treatment agents, and in-situ treatment. Due to the significant cost savings, in-situ treatment of groundwater has drawn considerable interest in recent years. In-situ treatment of groundwater is discussed in *NEW APPROACH TO IN-SITU TREATMENT OF CONTAMINATED GROUNDWATERS;* McMurty et at., *Environmental Progress* 1985.

McMurtry discusses the use of permeable barrier walls placed in trenches excavated into native aquifers to treat contaminated groundwater. The permeable barrier contains appropriate treatment media, such that the quality of the contaminated groundwater flowing through the media is significantly improved. McMurtry states that most in-situ groundwater treatments will be in isothermal, anaerobic, reducing environments. Many in-situ groundwater treatment systems take advantage of this anaerobic, reducing environment, in conjunction with the selected treatment material to remove or transform the chemical contaminants in the groundwater into nonhazardous material. Typically treatment materials are limestone, activated carbon, active metals, or biological agents. These in-situ treatment systems, while removing or neutralizing many dangerous contaminants, may add other manmade contaminants to the groundwater. For example, a common treatment material for in-situ treatment is elemental or zero valent iron. While removing many contaminants, elemental iron adds iron and other metallic impurities (e.g., manganese) to the groundwater. Removal or neutralization of these manmade impurities from groundwater is essential in returning groundwater in a native aquifer to a useable state.

BRIEF SUMMARY OF THE INVENTION

An object of this invention is to provide a method to remove iron and manganese impurities present in groundwater due to a primary in-situ groundwater treatment material.

This and other objectives of the invention, which will become apparent from the following description, have been achieved by a novel improvement to in-situ groundwater treatment systems to remove secondary sources of groundwater contamination released by the treatment media from primary in-situ treatment systems into native aquifers. The primary in-situ treatment system, for use with the treatment system of this invention, relies on the flow of groundwater, through an aquifer, into the primary treatment system to decontaminate the groundwater through the use of a metallic treatment material. The primary treatment system may add metallic-based contaminants while decontaminating the groundwater. The improvement of this invention is to oxygenate the oxygen-deficient groundwater after in-situ treatment by the metallic treatment material in order to remove the metallic-based contaminants added to groundwater by the primary in-situ treatment system. The treatment system of this invention is particularly useful when the groundwater is maintained in an anaerobic condition, and the primary treatment system and media is maintained under anaerobic conditions.

The primary in-situ groundwater treatment process includes determining the conditions of the groundwater in the aquifer and the contaminate; selecting and placing the primary metallic-based treatment material into the aquifer; directing the flow of the anaerobic groundwater through the primary treatment material to neutralize the contaminant while maintaining the groundwater under an anaerobic environment and permitting the treated groundwater to reenter the aquifer. During the course of treatment, a portion of the metallic-based primary treatment agent becomes soluble in the groundwater. The process of the invention relates to the oxygenation of the anaerobic groundwater by permitting it to pass through a second treatment material that provides a source of oxygen, thereby converting the solublized metal-based treatment media into insoluble metallic oxides. Preferably, the process of this invention oxygenates the oxygen deficient groundwater contaminated by metallic-based impurities from the primary treatment source by passing the contaminated groundwater through porous treatment media through which a flow of oxygenated gas is directed.

More specifically, the primary in-situ groundwater treatment process comprises, determining the direction, volume and velocity of a region of contaminated material dissolved within a stream of groundwater flowing through an aquifer. A metallic-based primary treatment material is provided. A primary repository is formed within the aquifer for containing a primary treatment material. The primary treatment material is placed in the primary repository such that the primary treatment material lies in the path of the region of contaminated material. The primary repository is oriented such that the region of contaminated material enters the primary repository through the upstream side thereof. The placement of the repository being such that the flow of the groundwater in the aquifer in which the primary repository is located causes the region of contaminated material to pass from the aquifer into the primary repository, pass through the treatment media within the primary repository, and exit from the downstream side of the primary repository. The permeability of the primary treatment material being such that the resistance to the passage of groundwater through the primary repository is substantially no greater that the resistance of the native aquifer to the passage of groundwater through the aquifer. The primary treatment material causes the dissolved contaminated material to be rendered inactive in the groundwater. During the course of the primary treatment, a portion of the primary treatment media dissolves in the stream of groundwater flowing through the primary repository, exits in the groundwater flowing therethrough, and enters into the native aquifer.

The improvement, as outlined hereinabove comprises: forming a secondary repository within the aquifer downstream of the first repository for containing a porous media. A source of oxygenating gas is placed adjacent to the base of the repository. Porous media is installed above the source of oxygenating gas such that the porous media lies in the path of the flow of dissolved primary treatment material. The orientation of the secondary repository is such that the flow of dissolved metallic-based contaminants from the primary treatment material enters the second repository through the upstream side thereof. The placement of the secondary repository being such that the flow of the groundwater in the aquifer in which the second repository is located causes the flow of dissolved primary treatment material to pass from the aquifer into the second repository, pass through the second repository from side to side thereof, and exit from the downstream side of the second repository. The permeability of porous media is such that the resistance to the passage of groundwater through the second repository is substantially no greater that the resistance of the native aquifer to the passage of groundwater through the aquifer. The oxygenating gas is directed up though porous medium such that the flow of groundwater containing the dissolved contaminants, based on the primary treatment material, in the groundwater is oxygenated thereby making the dissolved primary treatment material insoluble.

The process is of particular utility when the primary treatment material contains elemental iron or manganese. Further, the process of this invention is most beneficial when the dissolved iron in the groundwater from the primary treatment material is made into insoluble oxides.

BRIEF DESCRIPTION OF THE SEVERAL VIEWS OF DRAWINGS

With this description of the invention, a detailed description follows with reference being made to the accompanying figures of drawings which form part of the specification, in which like parts are designated by the same reference numbers, and of which:

The invention is not limited in its application to the details and construction and arrangement of parts illustrated in the accompanying drawings since the invention is capable of other embodiments that are being practiced or carried out in various ways. Also, the phraseology and terminology employed herein are for the purpose of description and not of limitation.

DETAILED DESCRIPTION OF THE INVENTION

Description of the Preferred Embodiment(s)

Figure 1:
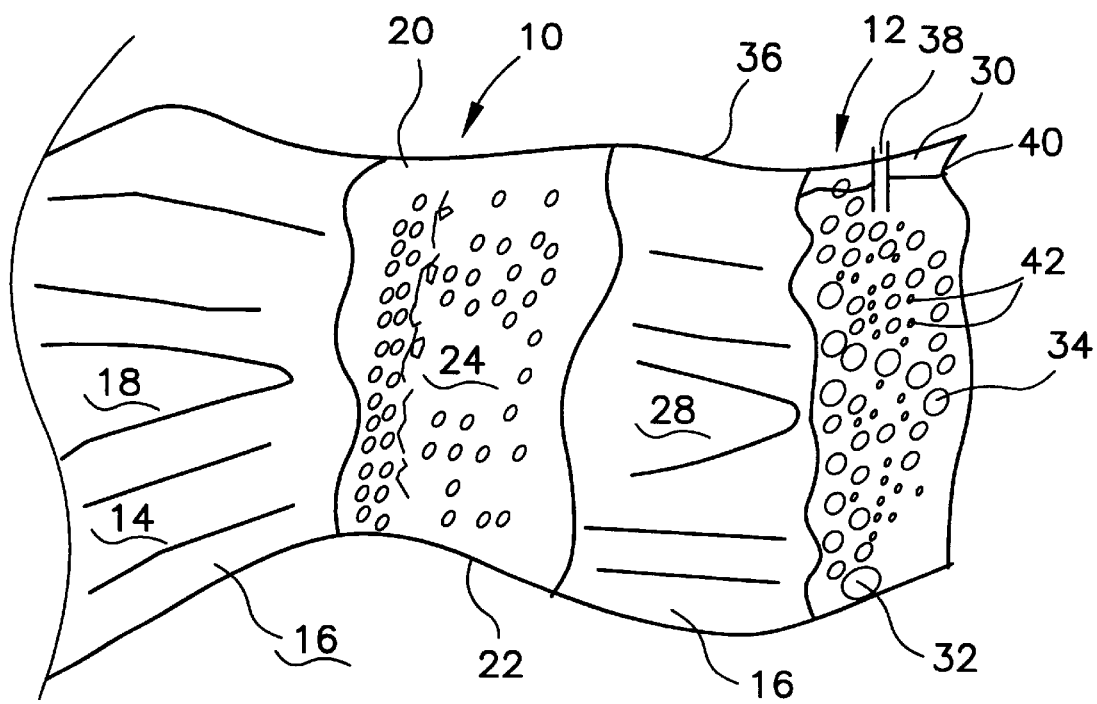
FIG. 1 is a cross-sectional view illustrating the treatment system of this invention.
Figure 2:
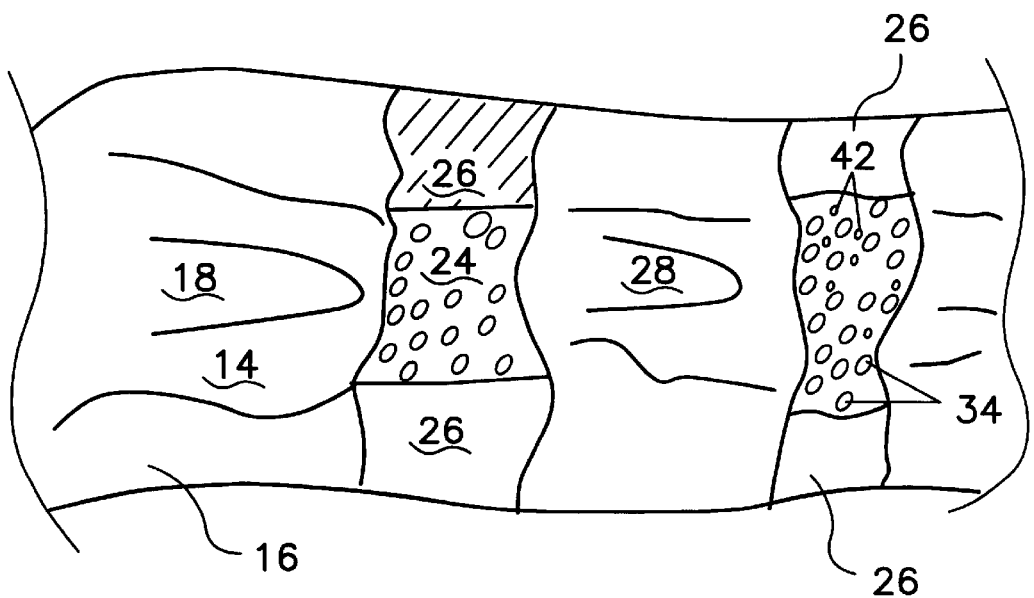
FIG. 2 is an enlargement of the top cross-sectional view illustrating the aeration system for use with this invention.

Referring to FIG. 1 a typical first in-situ groundwater treatment system is shown generally at 10. The improvement of this invention is shown generally at 12. Under normal condition groundwater 14 flows though an aquifer 16. A zone of contamination 18, within the aquifer 16, contains manmade or natural impurities that have entered the aquifer 16 and which contaminants are carried by the flow of groundwater 14. The typical first in-situ treatment system 10 includes a trench or repository 20 formed within the aquifer 16, generally perpendicular to the flow of groundwater 14 through the aquifer 16 and down to the underlying bedrock 22. The repository is filled with primary treatment media 24, such as active metals, activated carbon, limestone, or a biological agent. Typically, when the repository 20 is to be placed across the aquifer 16 for a significant distance, a portion of the repository may be filled with an impermeable material to form a barrier 26 across the aquifer 16, as shown in FIG. 2. The lower cost barrier 26 helps to reduce the overall cost of the treatment system by reducing the amount of primary treatment media 24 needed to neutralize the zone of contamination 18 within the groundwater 14. The barrier 26 redirects the flow of groundwater 14 to that section of the repository 20 containing the primary treatment media 24 and funnels the zone of contamination 18 through the primary treatment media 24.

Groundwater 14 exiting the first treatment system 10 may contain the neutralized contaminants and secondary contaminants 28 dissolved into the groundwater 14 from the primary treatment media 24. When active metals, such as iron (either elemental or zero valent iron), copper or other metals are used, the resulting secondary contamination 28 may require the need for additional processing before the groundwater 14 can be used as potable water. The treatment provided by the secondary treatment system 12 of this invention neutralize the secondary contaminants 28 introduced into the groundwater 14 by the primary treatment media 24. The secondary contaminants 28 are in the form of soluble salts or compounds of the metal from which the primary treatment media is made. The secondary treatment system 12 of this invention consists of a second trench or repository 30 downstream of the first treatment system 10 so as to further treat the groundwater 14 containing the secondary contaminants 28. The second repository 30, like the first repository, is excavated down to bedrock 22 and parallels the primary treatment system. A porous or perforated tube 32 is placed adjacent to the bedrock 22. A porous fabric material may be placed around the perforated tube 32 in order to prevent soil or clay from entering the perforated tube 32 and forming an obstruction. Porous media 34 is placed over the perforated tube 32 to fill the space between the bedrock 22 and a distance approximately 0.5 to 1 foot below the normal ground level 36. Vent tubes 38 are inserted into the porous media 34 at selected distances from one another. The vent tubes 38 enter the porous media 34 to provide pressure relief for the secondary system. The space between the top 40 of the porous media 34 and ground level 36 may be filled with an appropriate material such as soil or fine gravel.

A flow of oxygenated gas 42 is passed though the porous media 34. The source of oxygenated gas can be compressed oxygen stored in tanks (not shown), a compressed gas stored in a tank wherein the gas contains from 15 to 40 volume percent oxygen, or compressed air provided from a storage tank or a standard air compressor. The preferred source of the oxygenated gas is to provide ambient air with the aid of a compressor. The gas flow rate should be at level sufficient to convert a substantial portion of the secondary contaminant 28 of solublized metal-based primary treatment media into insoluble oxides prior to the exit of the groundwater 14 from the secondary treatment system. The groundwater 14 containing secondary contaminants 28 enters the secondary treatment system 12 where it is oxygenated by the flow of oxygenated gas 42 through the porous media 34, thereby altering the secondary contaminants 28 to an insoluble oxide and removing the secondary contaminants 28 from the groundwater 14.

Figure 3:
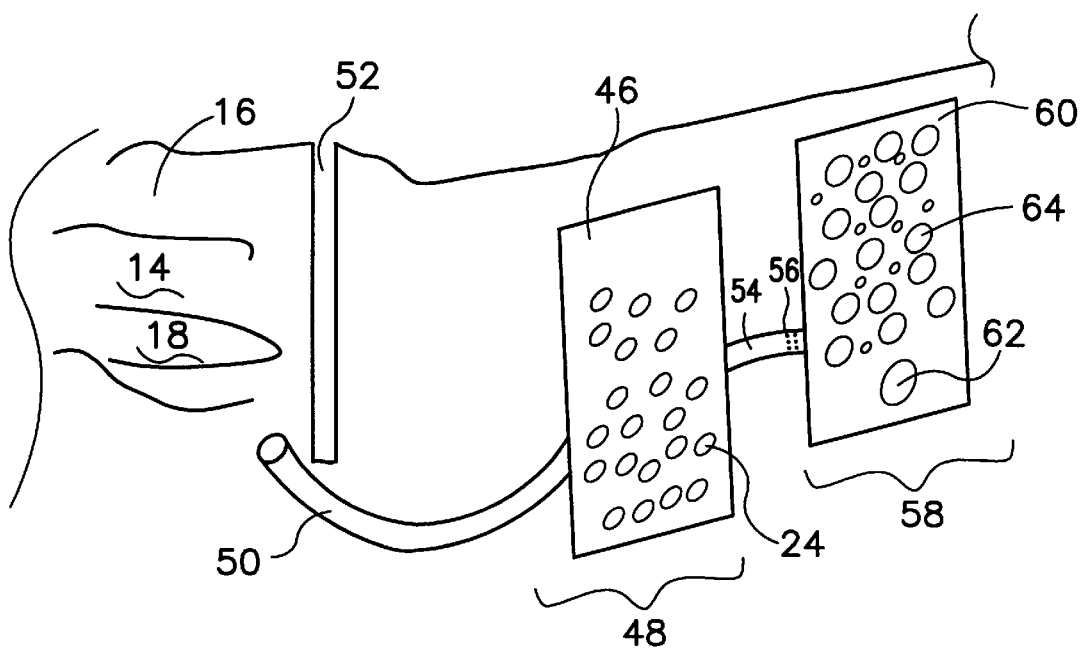
FIG. 3 is an alternative arrangement of the instant invention wherein the primary treatment system is tank-based.

An alternative primary treatment system for use with the improvement of this invention is shown in FIG. 3. In this embodiment, a tank or semi-rigid container 46 containing the primary treatment media 24 encompasses the primary treatment system 48. With this embodiment the groundwater 14 is channeled to the primary treatment system 48 by appropriate means, such as a collection system 50 in conjunction with an impermeable barrier 52 or by directly pumping the groundwater to the tank. The effluent 54 from the semi-rigid container 46 may contain the neutralized contaminants and secondary contaminants 56 dissolved into the groundwater 14 from the primary treatment media 24. Prior to being returned to the groundwater 14 the effluent is treated by a secondary treatment system 58, similar to that discussed hereinabove. This secondary treatment system 58 may in the form shown generally at 12 (in FIG. 1) or it may be a secondary tank system 60 containing a source of oxygenating gas 62 and porous media 64. This arrangement may be in-situ (below ground level) or ex-situ (above ground level)

Thus, in accordance with the invention, there has been provided a method to remove iron and manganese impurities present in groundwater due to a primary in-situ groundwater treatment material.

With this description of the invention in detail, those skilled in the art will appreciate that modification may be made to the invention without departing from the spirit thereof. Therefore, it is not intended that the scopes of the invention be limited to the specific embodiments that have been illustrated and described. Rather, it is intended that the scopes to the invention be determined by the scope of the appended claims.

We claim:

1. A process for removing secondary sources of groundwater contamination from a primary in-situ groundwater treatment process in its native aquifer wherein a portion of a primary treatment material dissolves in the stream of groundwater flowing through a primary repository and exits the primary repository in the stream of groundwater flowing through the primary repository and enters into the native aquifer; comprising forming a second repository within the aquifer downstream of the primary treatment system for containing a porous media, placing a source of oxygenating gas adjacent to a base of the second repository, placing a porous media above the source of oxygenating gas such that the porous media lies in the path of the flow of dissolved primary treatment material;

placing the repository such that the flow of dissolved primary treatment material enters the repository through the upstream side thereof, the placement being such that the flow of the groundwater in the aquifer in which the second repository is located cause the flow of dissolved primary treatment material to pass from the aquifer into the second repository, pass through the second repository from side to side thereof, and exit from the downstream side of the second repository;

the permeability of the porous media being such that the resistance to the passage of groundwater through the second repository is substantially no greater than the resistance of the native aquifer to the passage of groundwater through the aquifer;

directing the oxygenating gas up though the porous media such that the flow of groundwater containing the dissolved primary treatment material in the groundwater is oxygenated thereby making the dissolved primary treatment material insoluble.

2. A process for removing secondary sources of groundwater contamination from a primary in-situ groundwater treatment process in its native aquifer wherein the primary in-situ groundwater treatment process comprises: determining the direction, volume and velocity of a zone of contaminated material dissolved within a stream of groundwater flowing through an aquifer;

providing a primary treatment material;

forming a primary repository within the aquifer for containing a primary treatment material, placing the primary treatment material in the primary repository such that the primary treatment material lies in the path of the zone of contaminated material;

placing the primary repository such that the zone of contaminated material enters the primary repository through the upstream side thereof, the placement being such that the flow of the groundwater in the aquifer in which the primary repository is located causes the zone of contaminated material to pass from the aquifer into the primary repository, pass through the repository from side to side thereof, and exit from the downstream side of the primary repository;

the permeability of the primary treatment material being such that the resistance to the passage of groundwater through the primary repository is substantially no greater that the resistance of the native aquifer to the passage of groundwater through the aquifer;

the primary treatment material causes the dissolved contaminated material to be rendered inactive in the groundwater;

a portion of the primary treatment material dissolves in the stream of groundwater flowing through the primary repository and exits the primary repository in the stream of groundwater flowing through the primary repository and enters into the native aquifer;

the improvement comprising:

forming a second repository within the aquifer downstream of the primary repository for containing a porous media, placing a source of oxygenating gas adjacent to the base of the second repository, placing a porous media above the source of oxygenating gas such that the porous media lies in the path of the flow of dissolved primary treatment material;

placing the second repository such that the flow of dissolved primary treatment material enters the second repository through the upstream side thereof, the placement being such that the flow of the groundwater in the aquifer in which the second repository is located causes the flow of dissolved primary treatment material to pass from the aquifer into the second repository, pass through the second repository from side to side thereof, and exit from the downstream side of the second repository;

the permeability of the porous media being such that the resistance to the passage of groundwater through the second repository is substantially no greater that the resistance of the native aquifer to the passage of groundwater through the aquifer;

directing the oxygenating gas up though the porous media such that the flow of groundwater containing the dissolved primary treatment material in the groundwater is oxygenated thereby making the dissolved primary treatment material insoluble.

3. The process of claim 1 wherein the primary treatment material contains elemental iron.

4. The process of claim 1 wherein the groundwater entering the primary repository is anaerobic.

5. The process of claim 1 wherein the groundwater exiting the primary repository is anaerobic.

6. The process of claim 3 wherein the dissolved iron in the groundwater from the primary treatment material is oxidized and made insoluble.

* * * * *